(12) United States Patent
Denenberg et al.

(10) Patent No.: US 10,992,617 B2
(45) Date of Patent: Apr. 27, 2021

(54) TRANSMITTING RICH MEDIA BETWEEN A PERSONAL SERVER AND A MOBILE DEVICE OVER A WIDE AREA NETWORK

(71) Applicant: Oxy Systems, Inc., Watertown, MA (US)

(72) Inventors: Lawrence A. Denenberg, Newton, MA (US); Harry C. Forsdick, Lexington, MA (US); Michael A. Krasner, Watertown, MA (US); Graeme W. Smith, Stoneham, MA (US); Grant Gould, Somerville, MA (US); Marc J. Neuberger, Ann Arbor, MI (US); Marc D. Tanner, Somerville, MA (US)

(73) Assignee: Oxy Systems, Inc.

( * ) Notice: Subject to any disclaimer, the term of this patent is extended or adjusted under 35 U.S.C. 154(b) by 416 days.

(21) Appl. No.: 14/714,629

(22) Filed: May 18, 2015

(65) Prior Publication Data

US 2015/0249629 A1 Sep. 3, 2015

Related U.S. Application Data

(63) Continuation of application No. 10/892,769, filed on Jul. 16, 2004, now abandoned.

(51) Int. Cl.
*H04L 12/58* (2006.01)
*H04L 29/08* (2006.01)
(Continued)

(52) U.S. Cl.
CPC .............. *H04L 51/10* (2013.01); *H04L 12/18* (2013.01); *H04L 12/2854* (2013.01);
(Continued)

(58) Field of Classification Search
CPC ..... H04L 12/585; H04L 12/58; H04L 12/581; H04L 12/5855; H04L 29/08072;
(Continued)

(56) References Cited

U.S. PATENT DOCUMENTS 5,923,274 A * 7/1999 Fischer ................. H04L 1/0057
341/94
6,038,295 A * 3/2000 Mattes ................ H04M 3/4938
348/211.3

(Continued)

FOREIGN PATENT DOCUMENTS

DE 198 07 300 A1 * 7/1999 ............... H04N 1/00

OTHER PUBLICATIONS

Photon Vision Systems, Inc., "Low Cost Embedded Camera Image Processing Chip for the PVS VGA CMOS Image Sensor", pp. 1-2, Published: 2000.*
(Continued)

*Primary Examiner* — Robert B Harrell
(74) *Attorney, Agent, or Firm* — Blueshift IP, LLC; Robert Plotkin

(57) ABSTRACT

A mobile device, such as a cellular telephone or a personal digital assistant (PDA), stores first personal data, such as any one or more of image, video, and audio data. The mobile device transmits the first personal data over a first wide area network (WAN) to a personal server.

12 Claims, 14 Drawing Sheets

(51) Int. Cl.
*H04L 29/06* (2006.01)
*H04L 12/18* (2006.01)
*H04L 12/28* (2006.01)

(52) U.S. Cl.
CPC .............. *H04L 51/00* (2013.01); *H04L 67/04* (2013.01); *H04L 67/42* (2013.01); *H04L 69/329* (2013.01); *H04L 51/04* (2013.01); *H04L 51/066* (2013.01); *H04L 51/38* (2013.01); *H04L 63/10* (2013.01); *H04L 67/24* (2013.01)

(58) Field of Classification Search
CPC ..... H04L 29/06; H04L 43/00; H04L 12/2602; H04L 41/22; H04L 12/64; H04L 12/6418; H04L 29/06217; H04L 29/06442; H04L 12/18; H04L 12/28; H04L 12/5854; H04L 29/08; H04L 51/00; H04L 51/04; H04L 51/10; H04L 51/38; H04L 51/066; H04L 63/10; H04L 63/329; H04L 67/00; H04L 67/04; H04L 67/24; H04L 67/42; G06Q 10/107; H04B 1/38; H04B 1/3833; H04M 1/23; H04M 1/0214; H04M 1/0247; H04M 1/0237; H04M 1/72519; H04M 1/72522; H04M 2250/12; H04W 88/02; H04W 4/10; H04W 76/005; H04Q 2213/13204; H04Q 2213/13209; H04Q 2213/13176; G06F 13/00
USPC ..... 709/206, 224; 370/354; 455/90.2, 550.1, 455/575.1
See application file for complete search history.

(56) References Cited

U.S. PATENT DOCUMENTS

| | | | | |
|---|---|---|---|---|
| 6,392,697 B1* | 5/2002 | Tanaka | ............... | H04N 1/00307 348/220.1 |
| 6,763,226 B1* | 7/2004 | McZeal, Jr. | ........ | H04B 7/18595 370/354 |
| 6,919,923 B1* | 7/2005 | Tanaka | ............... | H04N 1/00106 348/220.1 |
| 7,742,073 B1* | 6/2010 | Cohen-Solal | ......... | G01S 3/7864 348/169 |
| 2001/0053703 A1* | 12/2001 | Kobayashi | ........... | H04N 5/2256 455/556.1 |
| 2002/0013161 A1* | 1/2002 | Schaeffer | ............ | H04M 1/0262 455/557 |
| 2002/0058536 A1* | 5/2002 | Horii | ................... | H04M 1/0256 455/566 |
| 2002/0061767 A1* | 5/2002 | Sladen | ................ | H04M 1/0202 455/556.1 |
| 2002/0078198 A1* | 6/2002 | Buchbinder et al. | ......... | 709/224 |
| 2002/0102938 A1* | 8/2002 | Tsubaki | ............... | H04B 1/3816 455/3.06 |
| 2002/0107737 A1* | 8/2002 | Kaneko | .................. | G06Q 30/02 705/14.68 |
| 2002/0184318 A1* | 12/2002 | Pineau | .............. | G06F 17/30905 709/206 |
| 2003/0026394 A1* | 2/2003 | Chapman | .............. | H04L 69/329 379/93.01 |
| 2003/0076421 A1* | 4/2003 | Dutta | ................. | H04N 5/23248 348/208.11 |
| 2003/0122957 A1* | 7/2003 | Emme | .................. | H04N 5/2256 348/370 |
| 2003/0227745 A1* | 12/2003 | Khoo | .................... | G06F 3/0231 361/679.3 |

OTHER PUBLICATIONS

Rick Smith, "MobileFocus", pp. 1-8, Published: Nov. 14, 1999.*
CNNMoney, "Inventor's 20/20 foresight", pp. 1-5, Published: Feb. 27, 2001.*
"Mobile Central", pp. 1-5, Published: Nov. 15, 1999.*
Ted Needleman, "Poptronics", pp. 36 and 46, Published: Apr. 2000.*
CNN.com, "First mobile videophone introduced", pp. 1-2, Published: May 18, 1999.*
Computing Japan, "This Month's Product Profile", pp. 1, Published: Aug. 1999.*
Dream House Software, "News and Reviews", pp. 1-9, Published: 1999-2001.*
"Taking pictures with your phone", BBC News (Sci/Tech)—p. 1—date: Tuesday, Sep. 18, 2001.*
Peter Kindlmann, "ASCII Art", Eng-info archive, pp. 1-2; date: Fri Dec. 19, 1997.*
Jlouderback "Nokia 3650 Adds Retro Rotary Dia-Pad", Nov. 19, 2002, pp. 1-4.*
Nokia, "Nokia 3650 Extended User's Guide" pp. 1-157 (note p. 78 to p. 79), dated 2003.*
NEC MobilePro™ 780 User's Guide, pp. 1-186. Date: Jan. 2000.*

* cited by examiner

TRANSMITTING RICH MEDIA BETWEEN A PERSONAL SERVER AND A MOBILE DEVICE OVER A WIDE AREA NETWORK

BACKGROUND

Field of the Invention

The present invention relates to network information services and, more particularly, to techniques for providing network services to mobile devices.

Related Art

Mobile electronic devices, such as cellular telephones, personal digital assistants (PDAs), and laptop computers, continue to proliferate as they increase in functionality and decrease in size and price. Furthermore, all kinds of mobile electronic devices are increasingly being equipped with wireless Internet access as a standard feature. As a result, mobile devices currently provide a range of features previously only available from full-featured PCs, but with the obvious advantage of increased mobility.

Mobile devices typically communicate with a centralized server, such as a web server, instant messaging (IM) server, or SMS (Short Message Service) server, which performs requested services on behalf of the mobile device. Referring to FIG. 1A, for example, a diagram is shown of a prior art communications system 100 in which a mobile device 102 communicates with a server 104 over a network 106, such as a cellular telephone network. The connection 108a-b between the mobile device 102 and server 104 is abstracted to represent both the physical connection and the logical connection between the device 102 and server 104. If, for example, the server 104 is an email server, the mobile device 102 may send and receive email through the server 104. For example, the mobile device may send a request over the connection 108a-b to receive any new email messages, in response to which the server 104 may retrieve and transmit any new email messages over the connection 108a-b to the mobile device 102. The server 104 typically is maintained by a service provider and may provide service to a large number of mobile devices simultaneously. Depending on the type of service provided by the server 104, the user of the mobile device 102 may pay a fee to the provider of the server 104, which may be a different provider than the provider of the network 106 and/or connection 108a-b, to which the mobile device user may pay separate fees.

Instant messaging (IM) is an increasingly popular service being provided on a variety of networks. When a user transmits an instant message over an IM network to another user on the network, the message is displayed immediately on the recipient's screen. Users may therefore use instant messaging to conduct online conversations in real-time, much like telephone conversations. Many users prefer instant messaging to email because of its immediacy. Multiple users may simultaneously engage in an IM conversation, sometimes referred to as a "group chat."

Referring to FIG. 1B, a diagram is shown of a prior art instant message system 120, which includes a centralized IM server 124 coupled to a plurality of IM clients 122a-d over persistent connections 126a-d, respectively. For ease of illustration and explanation, FIG. 1B does not show the network itself or the devices (such as desktop computers) that may be used to perform instant messaging in the system 120. IM client 122a may, for example, transmit an instant message to IM client 122b by transmitting the message using an appropriate protocol (referred to herein as an "instant messaging protocol") over connection 126a to IM server 124. IM server 124 may relay the message over connection 126b to IM client 122b. In other words, IM server 124 acts as an intermediary for all of the IM clients 122a-d.

Although instant message was originally implemented for use on desktop and laptop personal computers (PCs), more recently mobile devices have been equipped with the ability to engage in instant messaging. For example, referring to FIG. 1C, a diagram is shown of a system 140 implementing a portion of the instant messaging system 120 shown in FIG. 1B. In current systems, a mobile device 142 is provided with IM functionality by installing a software IM client 122a on the mobile device 142. The IM client 122a on the mobile device 142 communicates with the IM server 124 over a network 144 through IM connection 146a-b.

The mobile device IM client 122a communicates with the IM server 124 using the same IM protocol that is used by a PC-based IM client. Due to various resource limitations of the mobile device 142, however, such as its limited screen, bandwidth, storage capacity, power supply, and processing power, the IM client 122a typically provides a set of features that is significantly scaled down in comparison to the set of features provided by a PC-based IM client. For example, the mobile device's IM client 122a may be unable to display more than a few lines of an IM conversation at a time, may be unable to store ("log") the contents of an IM conversation, and may be unable to receive and/or display images transmitted as attachments to IMs.

Therefore, although the users of mobile devices are increasingly looking to such devices to provide the same functionality as conventional full-featured PCs, providing such functionality in mobile devices remains a challenge, both because of the resource limitations just described and because of the relatively high cost of mobile (typically wireless) bandwidth compared to the relatively low cost of (typically wired) PC bandwidth. Some servers providers have attempted to address this problem by providing public servers for providing additional functions on behalf of mobile devices, such as filtering and logging instant messages. Such servers may, therefore, reduce the burden on the mobile clients to perform such functions. The establishment of such servers, however, imposes an additional cost on the server provider, which is then passed on to the customer. Furthermore, the mobile device users may be provided with only a limited ability to configure or otherwise control the services provided by the public servers, thereby limiting their usefulness to the end users.

What is needed, therefore, are improved techniques for providing network information services to mobile devices.

SUMMARY

A mobile device, such as a cellular telephone or a personal digital assistant (PDA), stores first personal data, such as any one or more of image, video, and audio data. The mobile device transmits the first personal data over a first wide area network (WAN) to a personal server.

A personal server is provided for use with a mobile device, such as a cellular telephone. The personal server provides services to the user of the mobile device and to others authorized by the user, but to no other users. The personal server may be a home PC of the user of the mobile device. The personal server may serve as a proxy server for a shared server that provides services to the mobile device. The personal server may relay messages between the mobile device and the shared server. The personal server may store, log, filter, and perform other processing on the user's personal data, such as messages transmitted by the mobile device and/or the shared server. The personal server may aggregate messages received from a plurality of shared servers. A non-personal server may perform additional services, such as configuring the personal server and temporarily storing data if the personal server becomes inaccessible.

For example, in one embodiment of the present invention, a system is provided which includes a mobile device configured for use by a user, and a personal server coupled to the mobile device over a first wide area network connection to provide services over the wide area network to the user and to others authorized by the user, but to no other users. In another embodiment of the present invention, a computer-implemented method is provided in which a personal server, coupled to a mobile device over a first wide area network connection, provides services over the wide area network to a user of the mobile device and to others authorized by the user, but to no other users.

In yet another embodiment of the present invention, a system is provided which includes mobile device configured for use by a user, and a personal server coupled to the mobile device over a first wide area network connection to transmit personal data between the mobile device and the user and others authorized by the user, but no other users. In a further embodiment of the present invention, a computer-implemented method is provided in which a personal server, coupled to a mobile device over a first wide area network connection, transmits personal data between the mobile device and the user of the mobile device (and others authorized by the user), but to no other users.

Other features and advantages of various aspects and embodiments of the present invention will become apparent from the following description and from the claims.

DETAILED DESCRIPTION

A personal server is provided for use with a mobile device, such as a cellular telephone. The personal server provides services to the user of the mobile device and to others authorized by the user, but to no other users. The personal server may be a home PC of the user of the mobile device. The personal server may serve as a proxy server for a shared server that provides services to the mobile device. The personal server may relay messages between the mobile device and the shared server. The personal server may store, log, filter, and perform other processing on the user's personal data, such as messages transmitted by the mobile device and/or the shared server. The personal server may aggregate messages received from a plurality of shared servers. A non-personal server may perform additional services, such as configuring the personal server and temporarily storing data if the personal server becomes inaccessible.

Figure 2A:
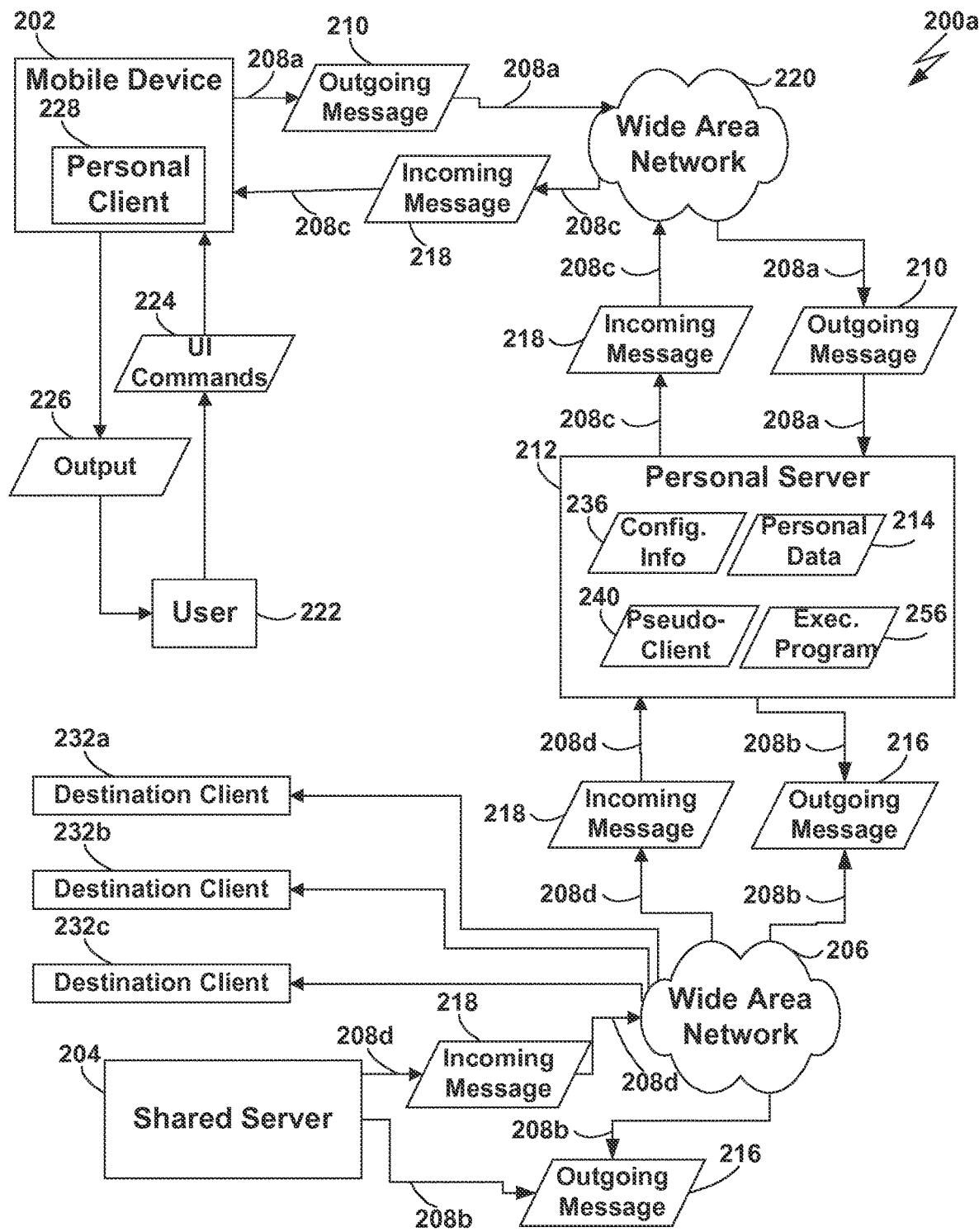
FIG. 2A is a block diagram of a system implemented according to one embodiment of the present invention.

Referring to FIG. 2A, a block diagram is shown of a system 200a implemented according to one embodiment of the present invention. The system 200a includes a mobile device 202 (such as a cellular telephone) coupled over a first wide area network 220 (such as a cellular telephone network) to a personal server 212 (such as a desktop or laptop PC). The mobile device 202 has a user 222 who is authorized to use the mobile device 202. The user 222 may, for example, be an owner of the mobile device 202 or someone authorized by the owner to use the mobile device 202, such as a friend or family member of the owner of the mobile device 202. In one embodiment of the present invention, the user 222 may be an owner of the mobile device 202 or someone authorized by the owner of the mobile device 202 to perform read-only actions (such as viewing email and browsing web pages) using the mobile device 202. The personal server 212 provides services to the user 222 and to others authorized by the user 222 to use the personal server 212, but to no other users. The personal server 212 may, for example, be a personal computer owned by the user 222. As described in more detail below, the personal server 212 may store personal data 214 associated with the user 222.

User 222 operates the mobile device 202 by providing commands 224 to the device 202 using a user interface provided by the device 202. Such a user interface may, for example, include hardware input components such as a keyboard, mouse, keypad, stylus, and/or touchscreen, as well as software for providing a graphical user interface to the user 222 and for processing the commands 224. Mobile device 202 provides output 226 to the user 222, such as by displaying text and/or graphics on a display screen. Various techniques for receiving input from and providing output to the user of a mobile device are well-known to those having ordinary skill in the art.

The mobile device 202 may communicate with the personal server 212 over the wide area network 220, such as by sending outgoing message 210 to the personal server 212 and by receiving incoming message 218 from the personal server 212. In the embodiment illustrated in FIG. 2A, outgoing message 210 is transmitted over WAN connection 208a and incoming message 218 is transmitted over WAN connection 208c. Both outgoing message 210 and incoming message 218 may, however, be transmitted over the same WAN connection between mobile device 202 and personal server 212. For example, the mobile device 202 may be an Internet-enabled cellular telephone, and the personal server 212 may be a PC having a permanent connection to the Internet. In such a case, the mobile device 202 may establish an Internet connection with the personal server 212 in any of a variety of ways well-known to those having ordinary skill in the art.

Incoming message 218 and outgoing message 210 may be any of a variety of kinds of messages, such as instant messages, email messages, or text messages (e.g., SMS messages). More generally, the term "message" refers herein to any kind of information transmitted over a network, whether such information represents a human-readable message or non-human readable data or commands. The personal server 212 may thereby provide a variety of services to the mobile device 202 over the wide area network 220.

The personal server 212 may serve as a proxy server for another, shared, server 204. The shared server 204 is "shared" in the sense that, unlike the personal server 212, it provides services to a plurality of independent users. One example of a plurality of "independent" users is a plurality of users having distinct instant messaging accounts on a public instant messaging server. The shared server 204 may, for example, be a conventional file server, email server, instant messaging server, or SMS server. In the embodiment illustrated in FIG. 2A, the personal server 212 is coupled to the shared server 204 over a second wide area network 206. Note, however, that the first wide area network 220 and the second wide area network 206 may be a single network rather than two distinct networks.

The personal server 212 may serve as a "proxy" server in the sense that the personal server 212 may serve as a proxy for the mobile device 202 in communications with the shared server. Recall, for example, that in the prior art instant messaging system 120 shown in FIG. 1B, each of the IM clients 122a-d communicates directly the IM server 124. In contrast, in the system 200a illustrated in FIG. 2A, the mobile device 202 communicates with the shared server 204 indirectly through the personal server 212. The personal server 212 may include a pseudo-client 240, which may be configured to communicate with the shared server 204 using an appropriate protocol. For example, if the shared server 204 is an instant messaging server, the pseudo-client 240 may be a conventional instant messaging client or other software that is capable of communicating with the shared server 204 using an appropriate instant messaging protocol.

Figure 3A:
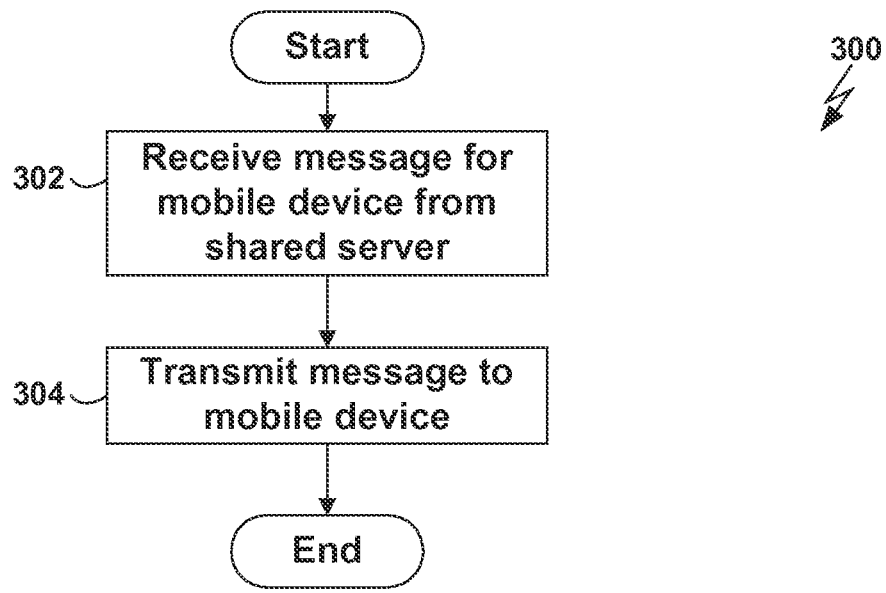
FIG. 3A is a flowchart of a method that is performed by a personal server to relay messages from a shared server to a mobile device according to one embodiment of the present invention.
Figure 3B:
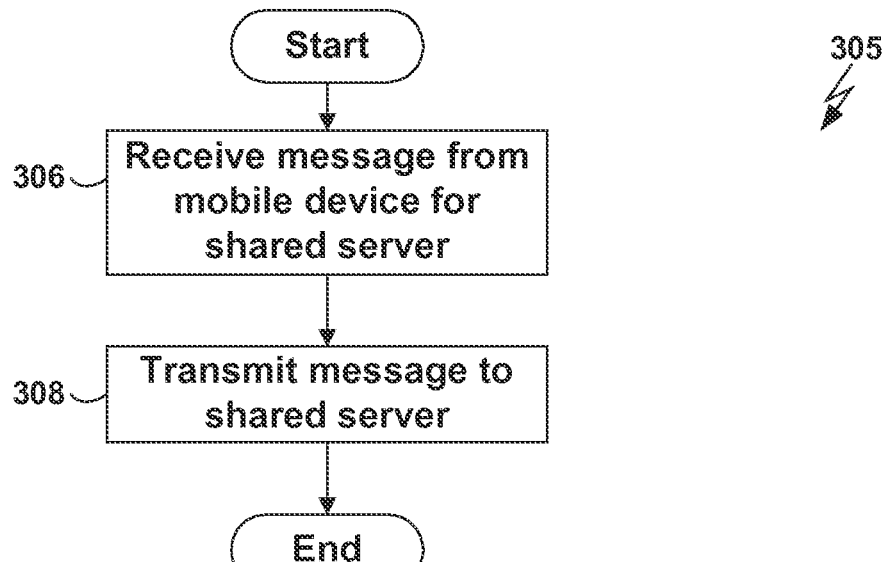
FIG. 3B is a flowchart of a method that is performed by a personal server to relay messages from a mobile device to a shared server according to one embodiment of the present invention.

The personal server 212 may provide a variety of services to the mobile device 202. For example, the personal server 212 may relay messages between the mobile device 202 and the shared server 204. For example, referring to FIG. 3A, a flowchart is shown of a method 300 that is performed by the personal server 212 in one embodiment of the present invention. The personal server 212 may, for example, receive incoming message 218 from the shared server 204 on connection 208d (step 302). The personal server 304 may transmit the incoming message 218 to the mobile device 202 on connection 208c (step 304). Similarly, referring to FIG. 3B (method 305), the personal server 212 may receive outgoing message 210 (step 306) to the shared server 204 as an outgoing message 216 on a connection 208b between personal server 212 and shared server 204 (step 308).

Figure 3C:
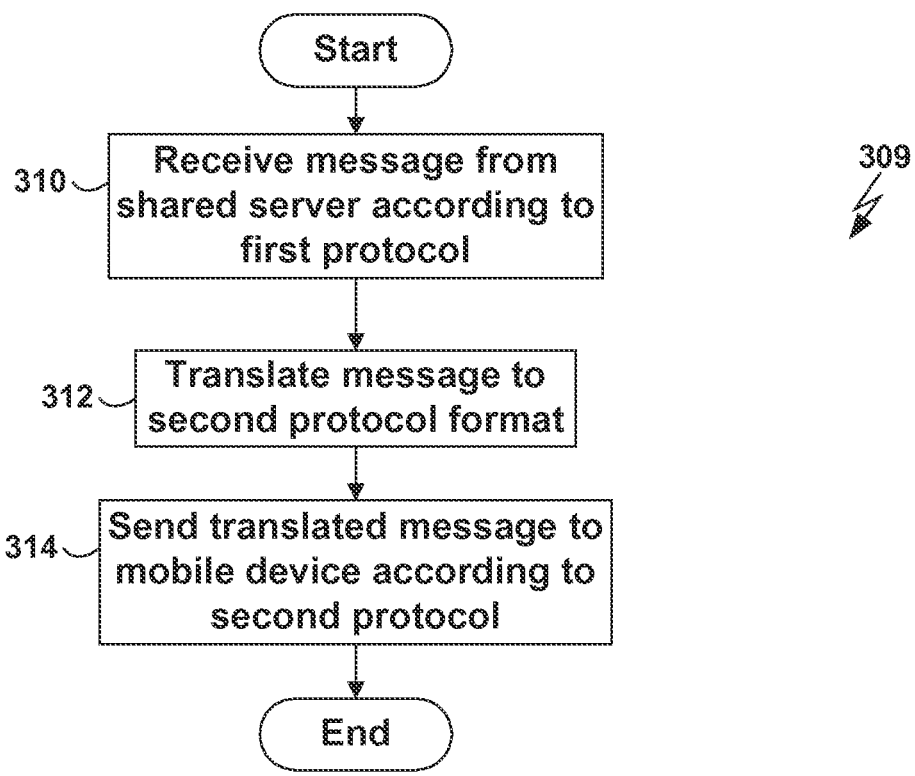
FIGS. 3C-3D are flowcharts of methods performed by a personal server to translate messages between a first and second protocol according to one embodiment of the present invention.
Figure 3D:
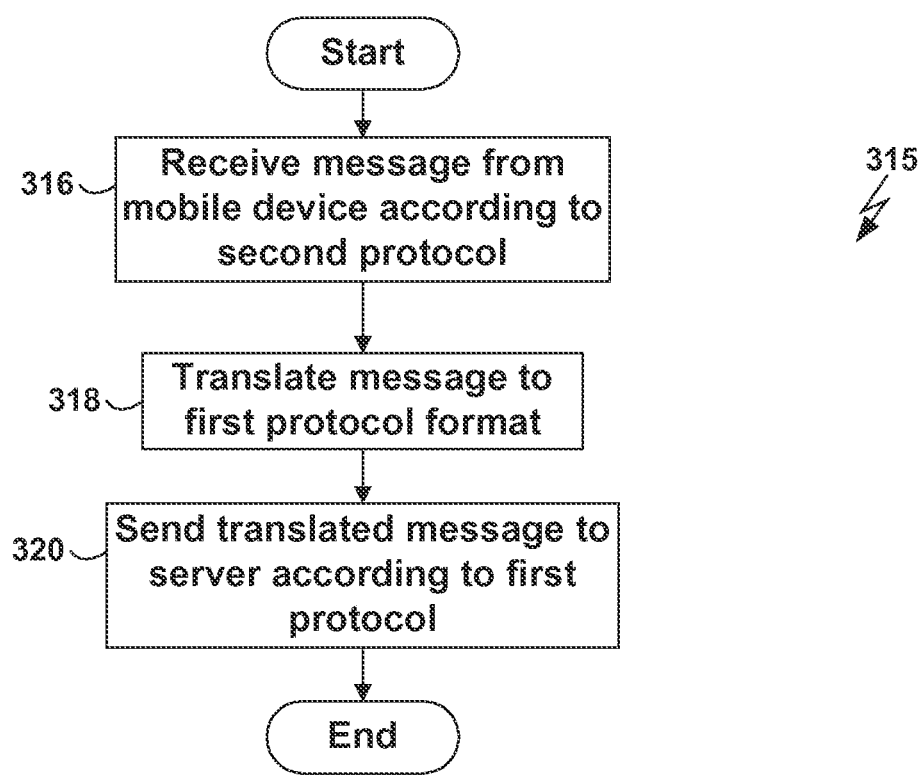

One function that may be performed by the personal server 212 is to translate incoming and outgoing messages from one protocol to another. For example, referring to FIG. 3C, a flowchart is shown of a method 309 that is performed by the personal server 212 in one embodiment of the present invention. Consider, for example, a case in which the shared server 204 is an instant messaging server and in which the mobile device 202 is not equipped with instant messaging capabilities. Assuming that the mobile device 202 is equipped, however, with email/SMS/IM capabilities, the personal server 212 may use the pseudo-client 240 to receive instant messages transmitted by the shared server 204 according to an instant messaging protocol (step 310) and convert such messages into email messages (step 312) before transmitting them to the mobile device 202 (step 314). Conversely, referring to FIG. 3D (method 315), the personal server 212 may receive email messages transmitted by the mobile device 202 (step 316) and convert them to instant messages (step 318) before transmitting them to the shared server 204 (step 320). More generally, the personal server 212 may convert messages from one protocol to another when relaying messages between the mobile device 202 and the shared server 204, thereby allowing communication therebetween which would not otherwise be possible. In some existing systems, such translation is performed by shared servers maintained by service providers. Performing such translation using the personal server 212 may be advantageous for a variety of reasons. For example, the personal server 212, which may otherwise be idle, may devote its processing resources exclusively to servicing the mobile device 202, thereby providing services more efficiently than a shared server.

Figure 3E:
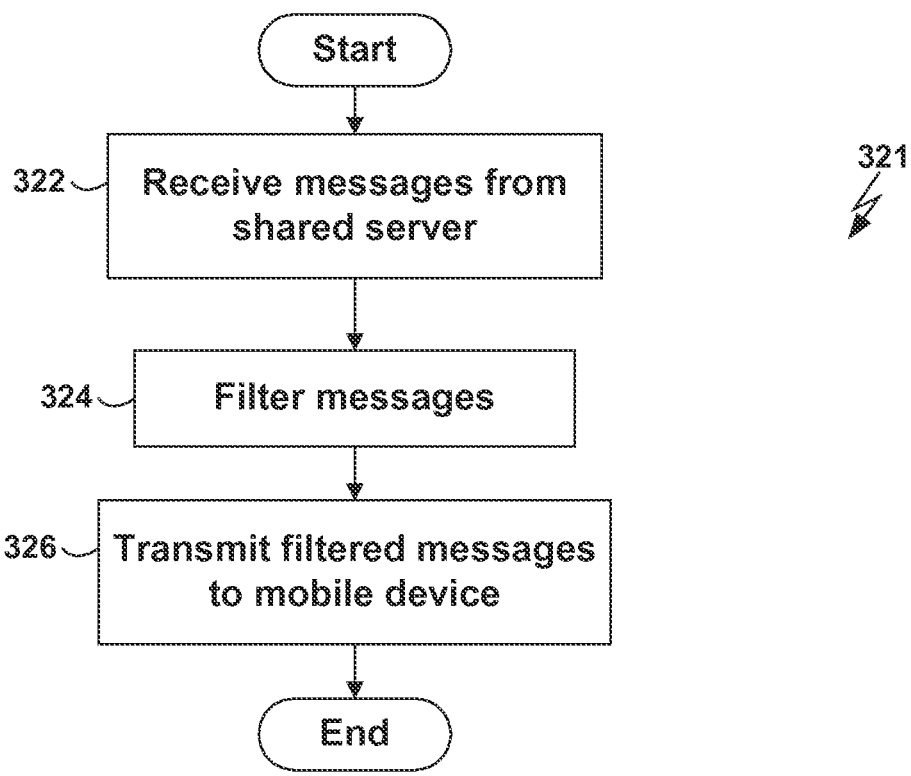
FIG. 3E is a flowchart of a method that is performed by a personal server to filter messages received from a shared server according to one embodiment of the present invention.

The personal server 212 may also perform filtering on messages received from the shared server 204. For example, referring to FIG. 3E, a flowchart is shown of a method 321 that is performed in one embodiment of the present invention by the personal server 212 to filter messages received from the shared server 204. The personal server 212 receives messages from the shared server 204 (step 322), filters the messages to produce filtered messages (step 324), and transmits the filtered messages to the mobile device 202 (step 326). As a result, the personal server 212 may forward less than all of the data received from the shared server 204 to the mobile device 202. Such filtering may be advantageous for a variety of reasons. For example, such filtering may decrease the cost of operating the mobile device 202 because the cost of the connection between the personal server 212 and the mobile device 202 may be higher than the cost of the connection between the personal server 212 and the shared server 204.

Figure 1A:
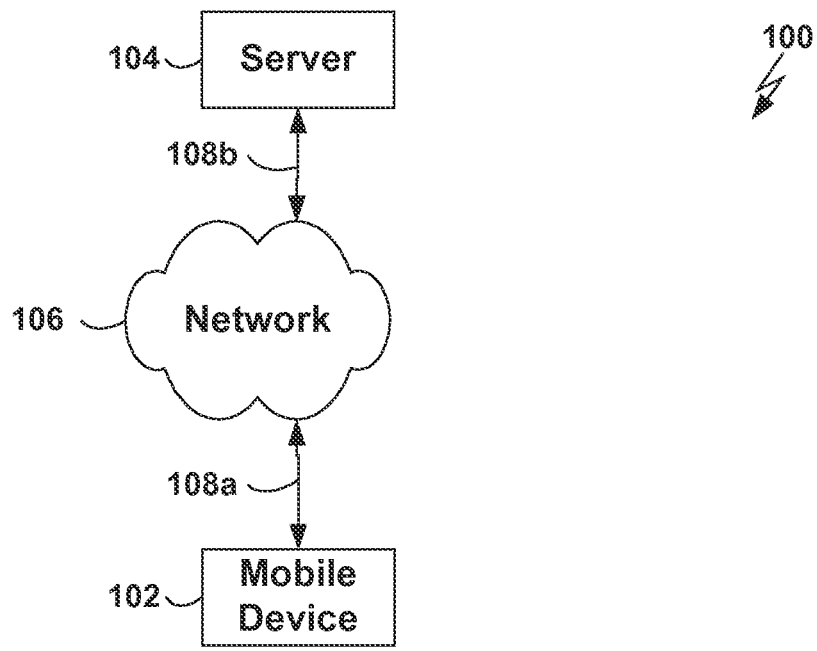
FIG. 1A is a diagram of a prior art communications system in which a mobile device communicates with a server over a network.
Figure 1B:
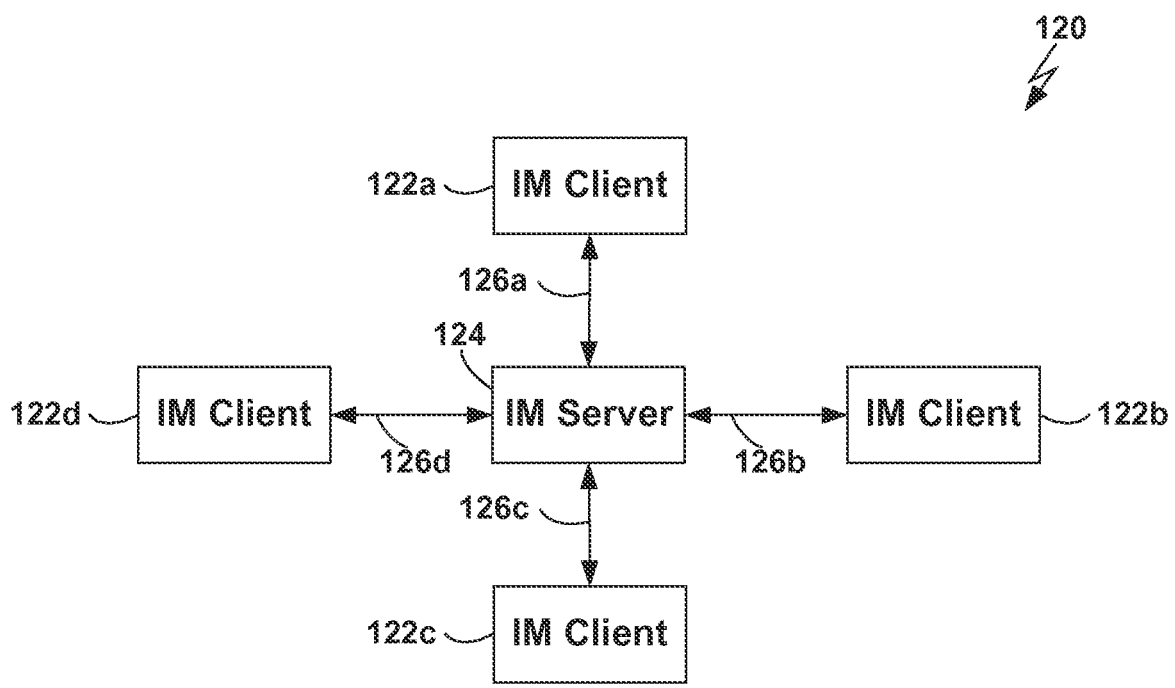
FIG. 1B is a diagram of a prior art instant messaging system including a centralized instant messaging server coupled to a plurality of instant messaging clients.
Figure 1C:
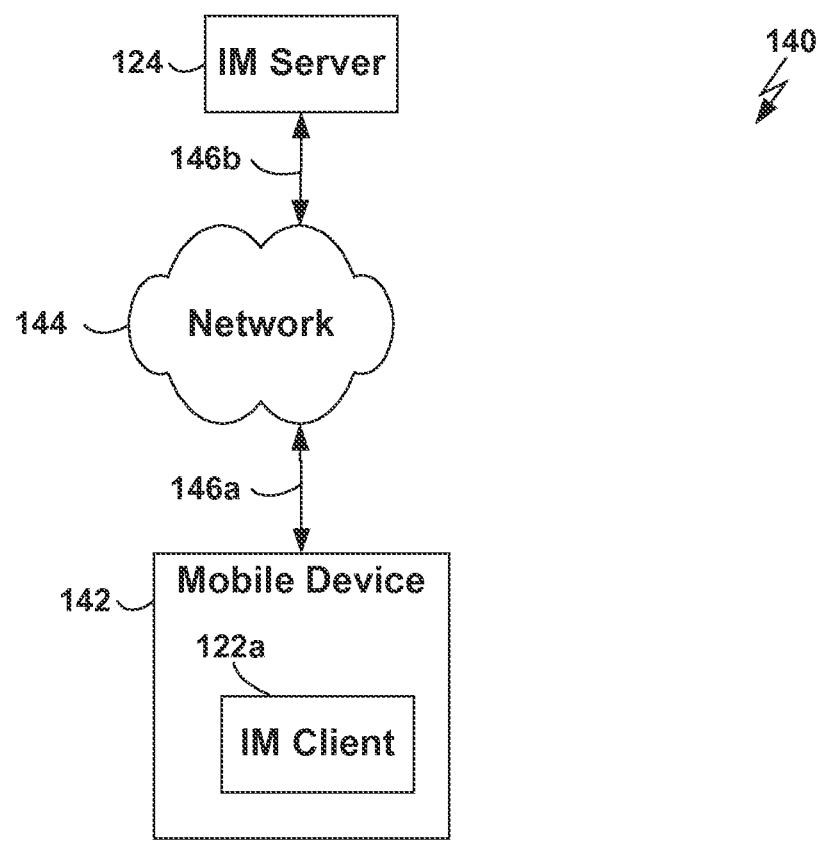
FIG. 1C is a diagram of a system implementing a portion of the prior art instant messaging system of FIG. 1B.

One example of information that may be filtered by the personal server 212 is instant messaging "presence information." In conventional instant messaging systems, such as the system 120 shown in FIG. 1B, the instant messaging server 124 maintains persistent connections 126a-d with the IM clients 122a-d. The central IM server 124 periodically sends presence information to each client, indicating whether other selected instant messaging users (sometimes referred to as "buddies") are connected to the network. Such presence information is transmitted to the client automatically, whether or not it is requested. Although the transmission of presence information may not be problematic on wired connections which are priced at a flat rate or by the hour, the repeated transmission of presence information may incur a significant cost to the user 222 when such information is transmitted over connections (such as cellular telephone connections) which are priced by usage. As a result, filtering presence information may provide a cost savings to the user 222 when the cost per bit of the connection between the personal server 212 and the shared server 204 is lower than the cost per bit of the connection between the personal server 212 and the mobile device 202. Such filtering may be performed in any of a variety of ways, such as by lengthening the period between transmissions (e.g., from 10 seconds to 5 minutes) or by only transmitting presence information to the mobile device 202 when such information has changed.

Note that the filtering just described may be implemented whether or not the mobile device 202 is instant-messaging enabled. For example, the mobile device 202 may include a personal client 228, which may be a conventional mobile instant messaging client, in which case the personal server 212 may act as a filter without converting from one protocol to another. Alternatively, the personal server 212 may both act as a filter and convert between the instant messaging protocol (or other protocol used by the shared server 204) and a protocol (such as an email protocol) recognized by the mobile device 202.

Figure 3F:
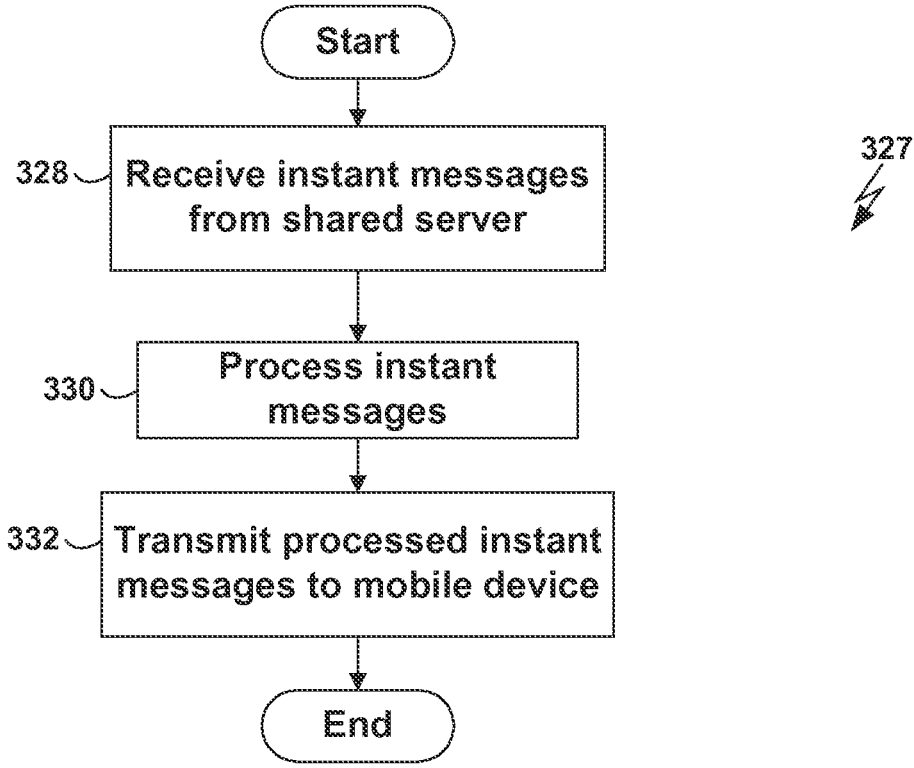
FIG. 3F is a flowchart of a method that is performed by a personal server to process instant messages on behalf of a mobile device according to one embodiment of the present invention.

More generally, the personal server 212 may serve as an "instant messaging proxy server" (IM proxy) that performs a variety of IM-related service for the mobile device 202. For example, the personal server 212 may log IM sessions in the personal data 214, filter obscene messages or other information, operate distribution lists, and maintain the required persistent connection with the IM server (e.g., the shared server 204) even when the mobile device 202 loses network connectivity due to an incoming phone call, momentary interruption of service, or other network connectivity problem. More generally, referring to FIG. 3F (method 327), the personal server 212 may receive instant messages from the shared (IM) server 204 in the same manner as any other conventional IM client (step 328), perform any kind of processing on the instant messages (step 330), and then transmit the processed instant messages to the mobile device (step 332).

Figure 2B:
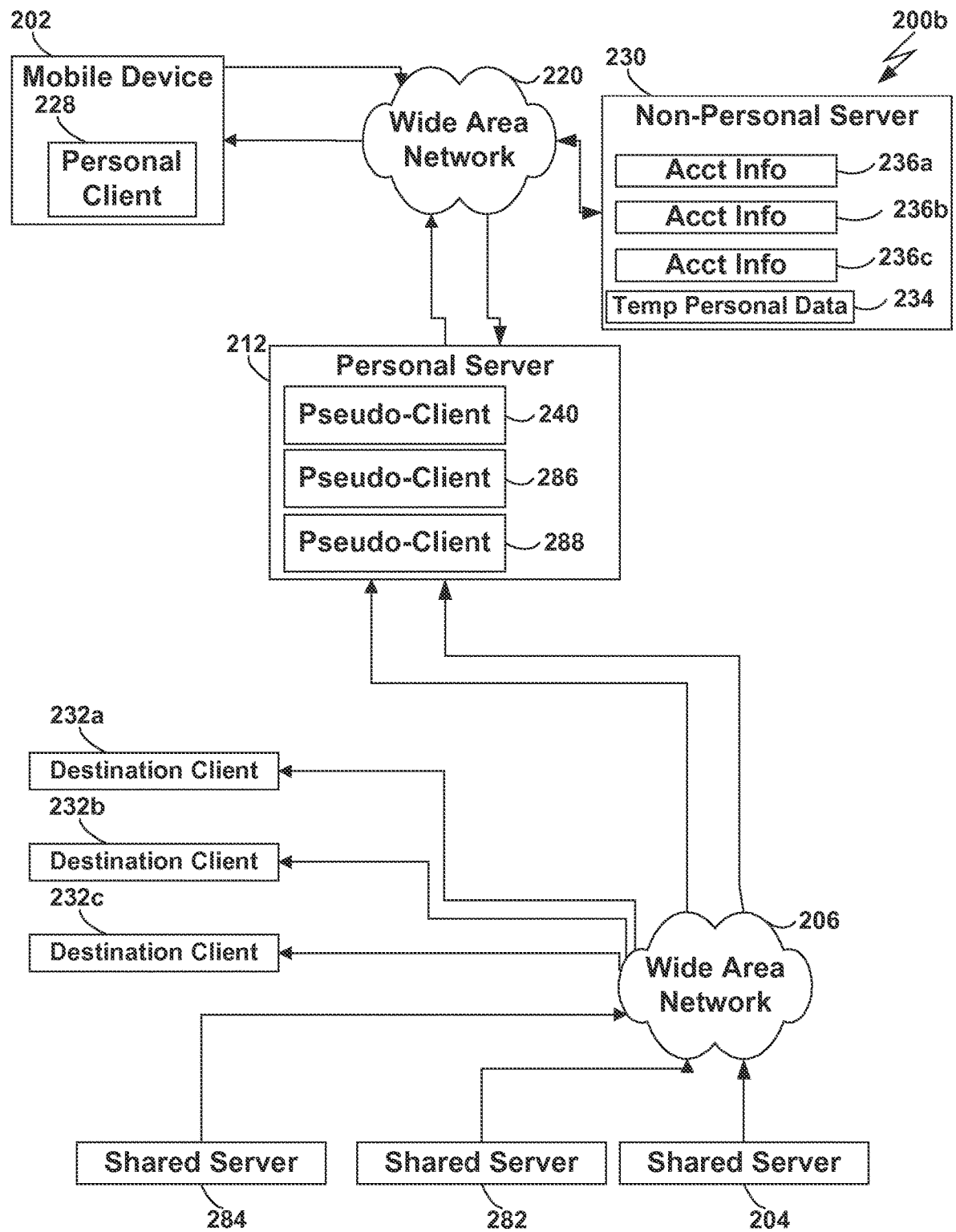
FIG. 2B is a diagram of a system implemented according to another embodiment of the present invention.
Figure 3G:
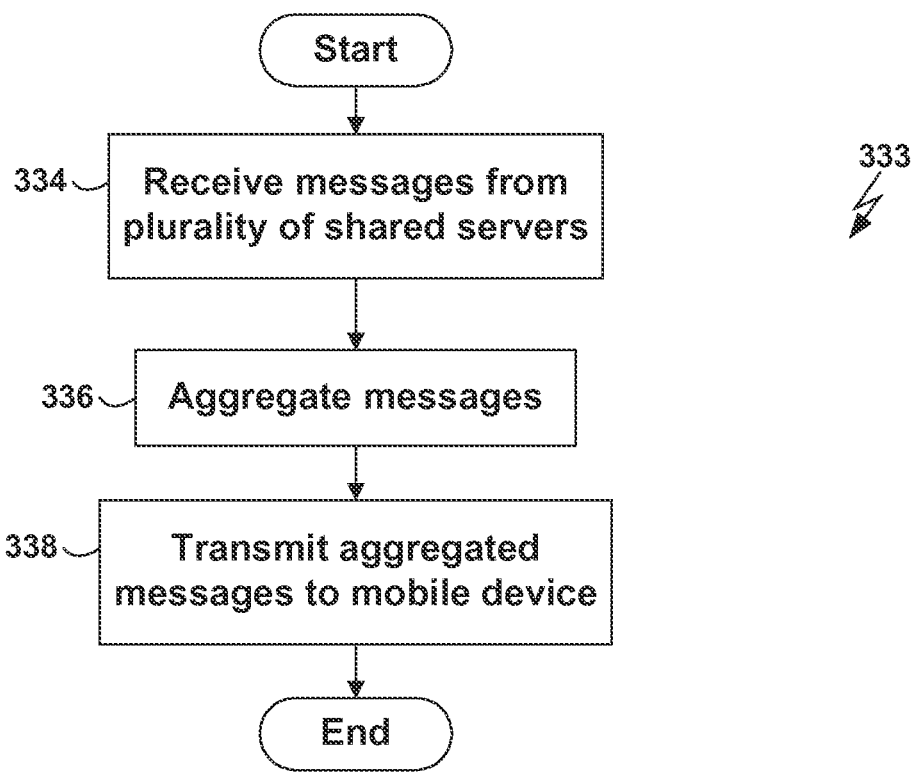
FIG. 3G-3H are flowcharts of methods performed by a personal server to aggregate and disaggregate messages, respectively, according to one embodiment of the present invention.
Figure 3H:
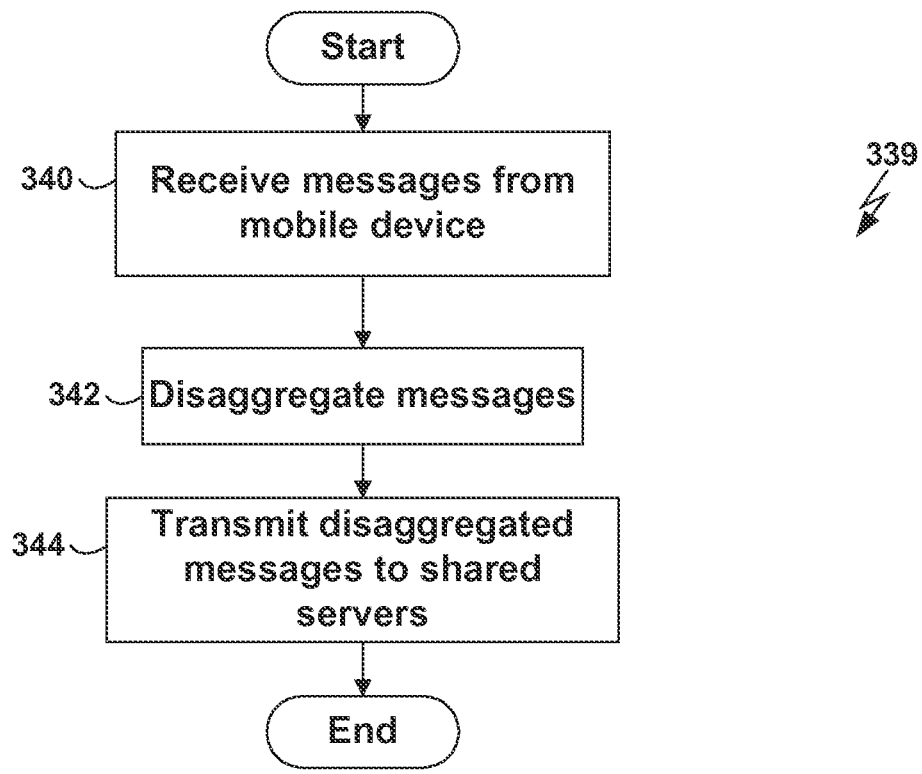

Another function that may performed by the personal server 212 is to act as an aggregator of services provided by a plurality of shared servers. For example, referring to FIG. 2B, a diagram is shown of a system 200b in another embodiment of the present invention. Referring to FIG. 3G, a flowchart is shown of a method 333 that is performed by the personal server 212 to aggregate messages in the system 200b according to one embodiment of the present invention. Individual messages are not shown in FIG. 2B for ease of illustration. The system 200b includes the elements of system 200a (FIG. 2A), as well as two additional shared servers 282 and 284. The shared servers 204, 282, and 284 may, for example, be instant messaging servers operating on different instant messaging networks and/or using different instant messaging protocols. Typically, for a device such as the mobile device 202 to communicate with all of the shared servers 204, 282, and 284, the mobile device 202 would be need to be equipped with a plurality of clients, each configured to communicate with a distinct one of the shared servers 204, 282, and 284. In contrast, in the embodiment illustrated in FIG. 2B, the personal server 212 is equipped with a plurality of pseudo clients 204, 282, and 284, capable of communicating with shared servers 204, 282, and 284, respectively. As a result, the personal server 212 may serve as a proxy for the mobile device 202 by receiving messages from the plurality of shared servers 204, 282, and 284 (step 334), aggregating the messages (step 336), and transmitting the aggregated messages to the mobile device 202 (step 338). For example, the personal server 212 may aggregate instant messaging streams received from the shared servers 204, 282, and 284 into a single instant messaging stream provided to the single personal client 228. Similarly, referring to FIG. 3H (method 339) the personal server 212 may receive messages from the mobile device 202 (step 340), disaggregate the messages (step 342), and then use the pseudo-clients 240, 286, and 288 to forward the disaggregated messages to the appropriate ones of the shared servers 204, 282, and 284 (step 344). Such aggregation and disaggregation may be combined with any of the other techniques disclosed herein, such as filtering and logging of communications.

In the embodiment illustrated in FIG. 2A, the mobile device 202 is provided with personal client 228 for communicating with the personal server 212 over the wide area network 220 using an appropriate protocol. The personal client 228 may, for example, be a conventional email client, IM client, or SMS client. The personal client 228 may, however, be a proprietary client 228 for communicating with the personal server 212 according to a proprietary protocol. For example, the personal server 212 may communicate with the shared server 204 using a standard protocol (such as SMS), yet communicate with the mobile device 202 using a proprietary (non-standard protocol), and convert between the two. As a result, the mobile device 202 may not need to be equipped with the kind of client (e.g., an instant messaging client) that would otherwise be required for communicating with the shared server 204.

Note that the mobile device 202 and the personal server 212 need not be coupled directly to each other. Rather, as shown in FIG. 2B, the system 200b may include a non-personal server 230 through which the mobile device 202 and the personal server 212 may communicate over the WAN 220. The non-personal server 230 may serve a plurality of users, unlike the personal server 212. One function that may be performed by the non-personal server 230 is to forward outgoing messages 210 from the mobile device 202 to the personal server 212 and to forward incoming messages 218 from the personal server 212 to the mobile device 202.

Figure 2C:
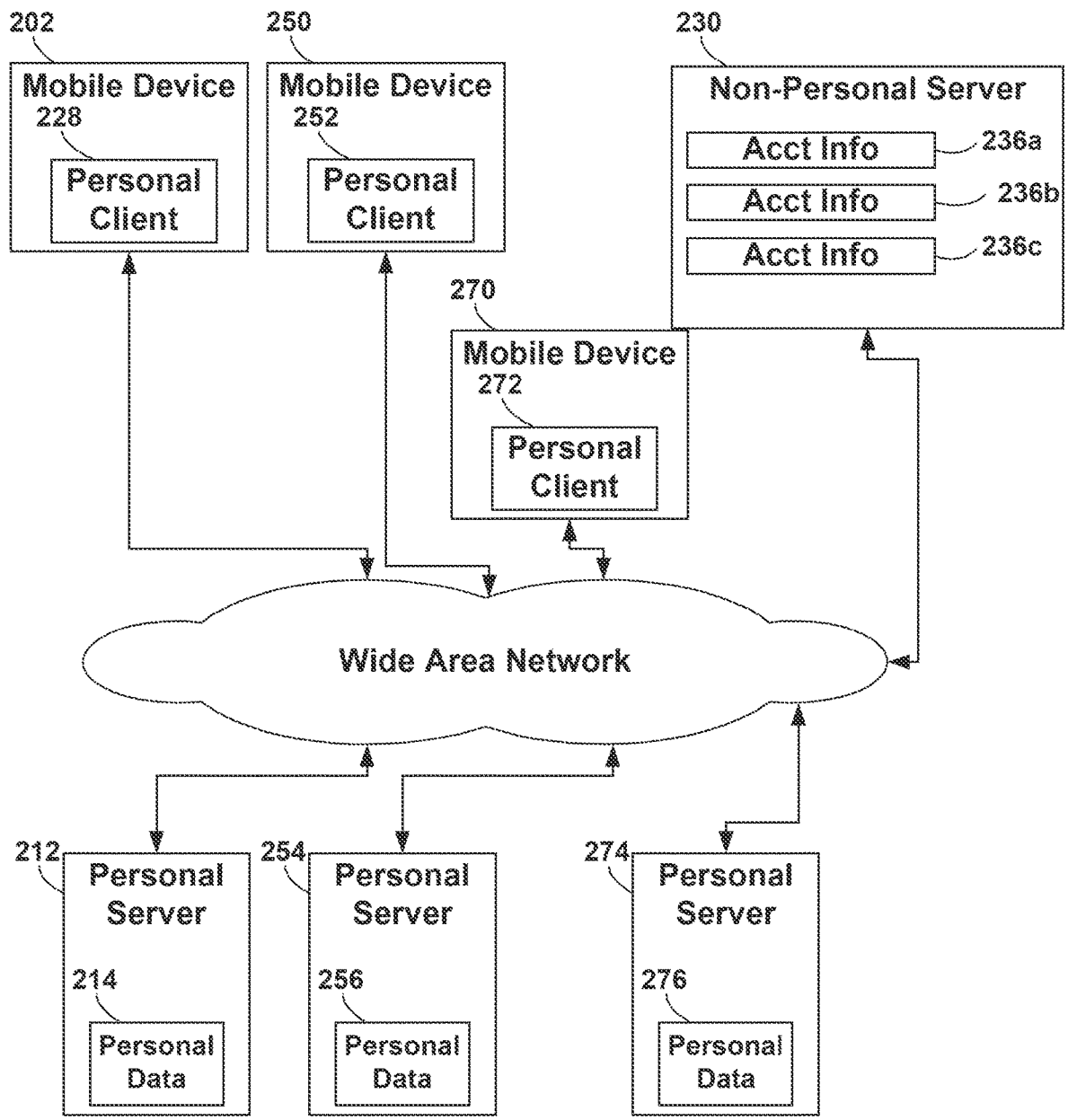
FIG. 2C is a diagram of a system including a plurality of mobile devices and a plurality of corresponding personal servers according to one embodiment of the present invention.

The non-personal server 230 may maintain account information 236a-c for each of the users served by the non-personal server 230. For example, referring to FIG. 2C, the system may include a plurality of mobile devices 202, 250, and 270, and a plurality of corresponding personal servers 212, 254, and 274. Account information 236a may be associated with the user 222 of mobile device 202 and personal server 212; account information 236b may be associated with mobile device 250 and personal server 254; and account information 236c may be associated with the mobile device 270 and personal server 274. Additional components of the personal servers 212, 254, and 274 (such as configuration information and pseudo-clients) are omitted from FIG. 2C for ease of illustration. The account information 236a-c may include any kind of information about the associated user and devices, such as usernames, passwords, device IDs, and configuration preferences.

Figure 3I:
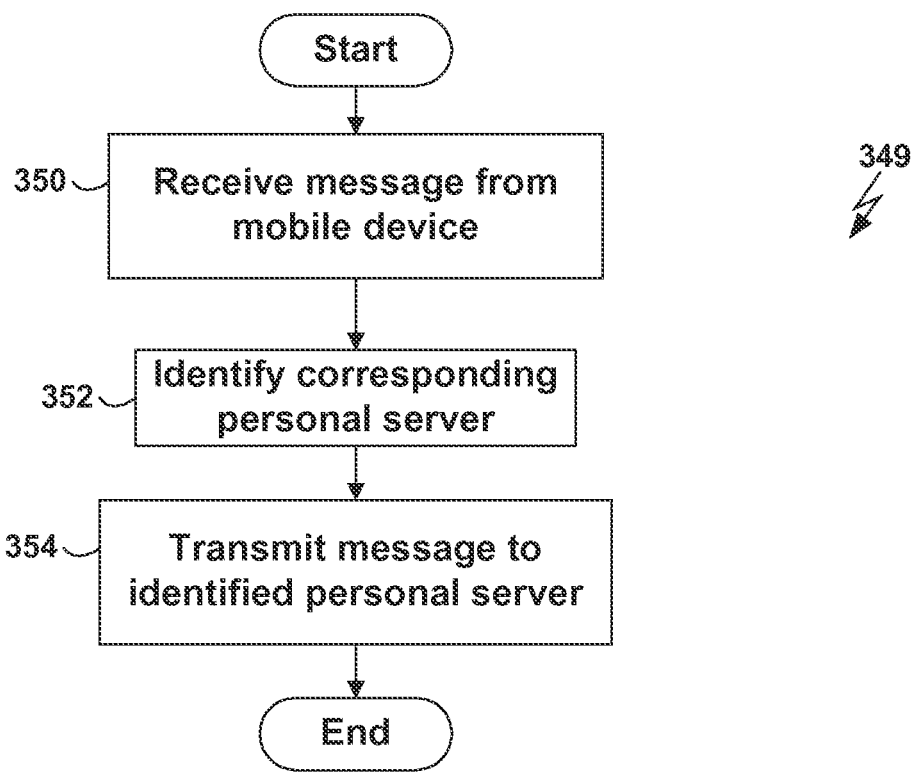
FIGS. 3I-3J are flowcharts of methods performed by a non-personal server to relay messages between a shared server and a personal server according to one embodiment of the present invention.
Figure 3J:
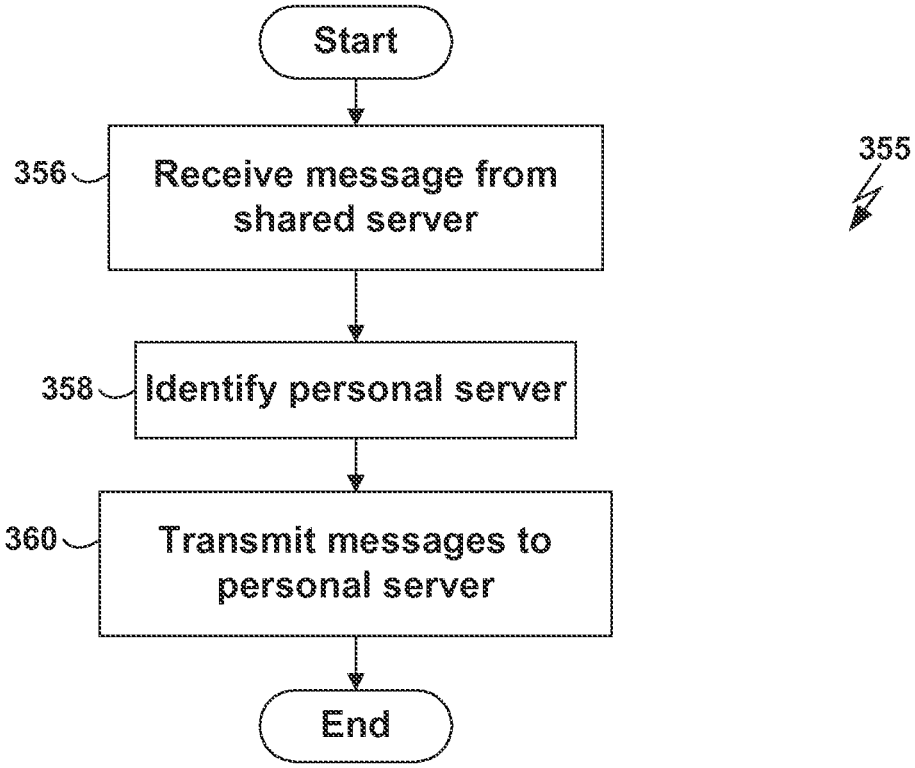

Referring to FIG. 3I, a flowchart is shown of a method 349 that is performed by the non-personal server 230 to relay messages from the mobile device 202 to the personal server 212 according to one embodiment of the present invention. The non-personal server 230 receives a message (such as outgoing message 210) from the mobile device 202 over the WAN 220 (step 350). The non-personal server 230 identifies the personal server that corresponds to the mobile device 202 (step 352). The non-personal server 230 may, for example, use the header of the outgoing message 210 and the account information 236a-c to identify the personal server 212 as the personal server corresponding to mobile device 202. The non-personal server 230 transmits the message 210 to the identified personal server over the WAN 220 (step 354). Conversely, referring to FIG. 3J (method 355), the non-personal server 230 may receive a message (such as incoming message 218) from the shared server 204 over the WAN 220 (step 356), identify the personal server that corresponds to the mobile device for which the message is destined (step 358), and transmit the message to the identified personal server (step 360).

Figure 3K:
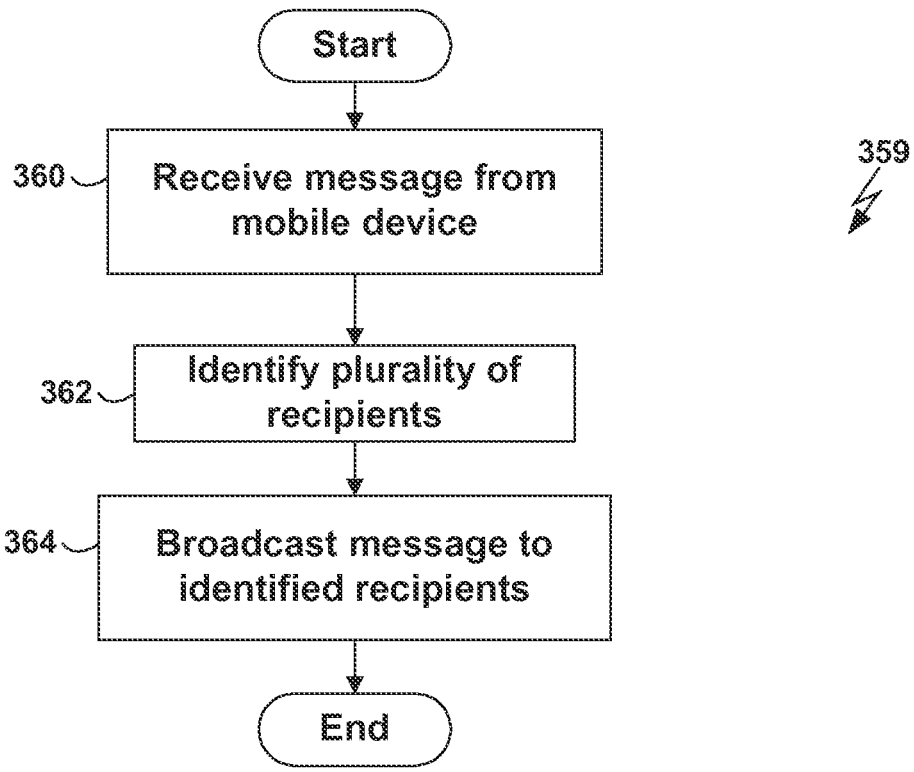
FIG. 3K is a flowchart of a method performed by a personal server to broadcast a message on behalf of a mobile device according to one embodiment of the present invention.

Another function that may be performed by the personal server 212 is to broadcast messages on behalf of the mobile device 202. For example, referring to FIG. 3K, a flowchart is shown of a method 359 that is performed by the personal server 212 in one embodiment of the present invention to broadcast messages on behalf of the mobile device 202. The mobile device 202 may transmit the single outgoing message 210 to the personal server 212 but specify a plurality of destinations. Referring to FIG. 2B, the personal server 212 may receive the outgoing message 210 (step 360), identify the plurality of destination clients 232a-c specified by the message (step 362), and broadcast multiple instances of the outgoing message 216 over the WAN 206 to a plurality of destination clients 232a-c (step 364). Such a technique may be advantageous for a variety of reasons. For example, the bandwidth of connections over the second WAN 206 may be less expensive than the bandwidth of the connections over the first WAN 220, as may be the case if the first WAN 220 is a cellular telephone network and the second WAN is a wired Ethernet network. As another example, the personal server 212 may have greater computing resources than the mobile device 202 and therefore be more suitable for transmitting multiple messages, as may be the case if the mobile device 202 is a cellular telephone and the personal server 212 is a full-featured desktop PC. Note that although the destination clients 232a-c are shown in FIG. 2A as being connected directly to the WAN 206, the destination clients 232a-c may be connected to the WAN 206 indirectly through the shared server 204 or in other ways.

Another function that may be performed by the personal server 212 is to store personal data 214 for the user 222. As used herein, the term "personal data" refers to any data associated with the user 222, such as text, image, or audio files created, received, owned, or otherwise under control of the user 222. It may be desirable to store such data 214 on the personal server 212 instead of or in addition to the mobile device 202 for a variety of reasons. For example, the personal server 212 may have significantly greater storage capacity than the mobile device 202. If the personal server 212 is a PC and the mobile device 202 is a cellular telephone, for example, the personal server 212 may easily have over a million times greater persistent storage capacity than the mobile device 202. The personal server 212 may also have significantly greater processing power than the mobile device 202, making it more suitable to perform image processing, spell checking, automatic text translation, text-to-speech translation, speech recognition, or other kinds of processing on the personal data 214.

The personal data 214 may come to be stored on the personal server 212 in any of a variety of ways. For example, the mobile device 202 may transmit the personal data 214 to the personal server 212 along with specific instructions to store the personal data 214 on the personal service 212. For example, the user 222 may create a word processing document using the mobile device 202 and instruct the personal server 212 to store the document to save storage space on the mobile device 202. Similarly, backup software executing on the mobile device 202 may transmit some or all of the data stored on the mobile device 202 for backup storage in the personal data 214. The personal server 212 may create the personal data 214 by logging incoming and/or outgoing messages which pass through the personal server 212, such as email messages, instant messages, or SMS messages. Such logging may be configured to be performed automatically, with or without filtering as desired by the user 222. Such configuration may be specified by the user 222 by modifying configuration information 236 in the personal server 212 and/or by modifying the account information 236a associated with the user 222.

Figure 3L:
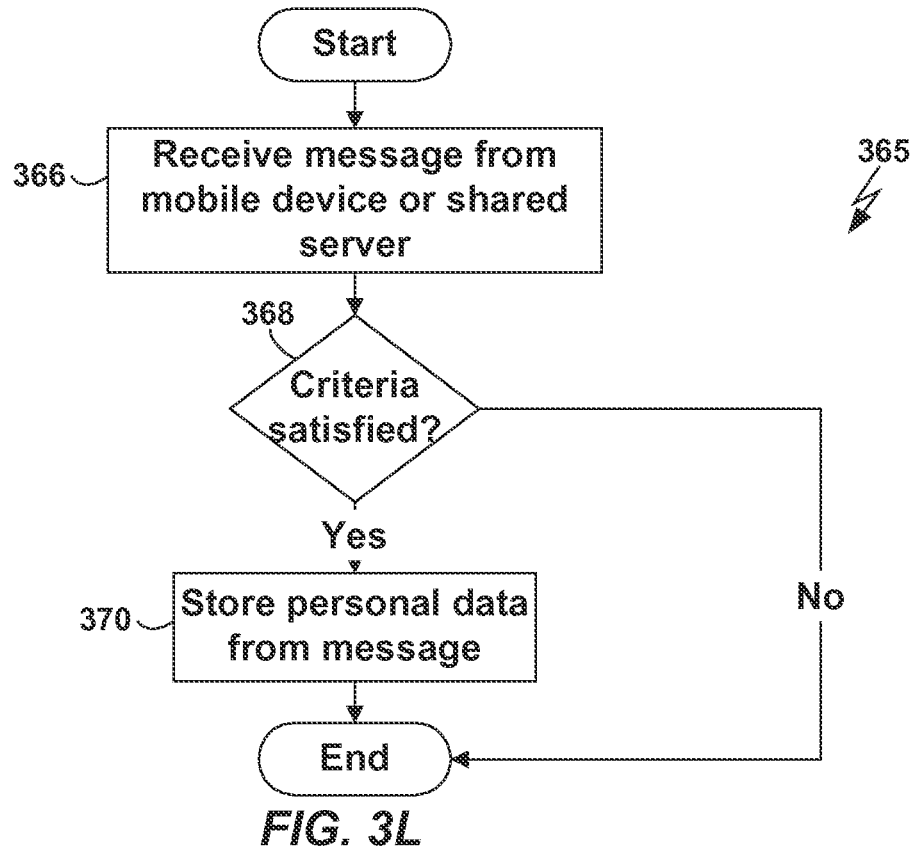
FIG. 3L is a method performed by a personal server to store data on behalf of a mobile device based on predetermined criteria according to one embodiment of the present invention.

The personal server 212 may also, for example, decide to store incoming messages 218 in the personal data 214 based on predetermined criteria. For example, referring to FIG. 3L, a flowchart is shown of a method 365 that is performed by the personal server 212 to store data based on predetermined criteria according to one embodiment of the present invention. The personal server 212 receives a message from the mobile device 202 or the shared server 204 (step 366). The personal server 212 determines whether the message satisfies predetermined criteria (step 368). If such criteria are satisfied, the personal server 212 stores the message, or data derived therefrom, in the personal data (step 370). The message may also be forwarded to the mobile device 202. For example, the personal server 212 may be configured to store any incoming messages larger than a particular predetermined size in the personal data 214 rather than transmitting such messages to the mobile device 202. Rather than forwarding such messages to the mobile device 202, the personal server 212 may, for example, transmit a smaller message to the mobile device 202 indicating that the original (larger) message has been received and stored in the personal data 214. The user 222 may, for example, choose to access the personal data 214 using the personal server directly 212, as in the case where the personal server 212 is a home PC owned by the user 222.

The user 222 may store personal data 214 directly on the personal server 212, without going through an intermediary such as the mobile device 202, the non-personal server 212, or the shared server 204. For example, user 222 may create files using the personal server 212 and store such files in the personal data 214. As another example, the user 222 may purchase, download, or otherwise obtain files (such as digital audio/video files) and store such files in the personal data 214. Once such files are stored in the personal data 214, they may be processed and transmitted in any of the ways described herein.

Figure 3M:
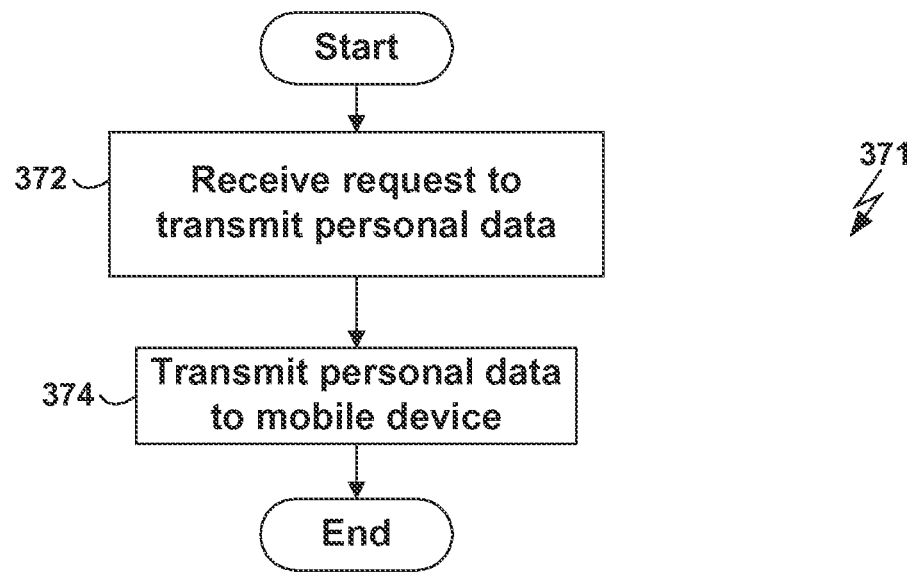
FIG. 3M is a method performed by a personal server to transmit personal data to a mobile device according to one embodiment of the present invention.

The personal server 212 may include means for transmitting some or all of the personal data 214 to the mobile device 202. For example, referring to FIG. 3M, a flowchart is shown of a method 371 that is performed by the personal server 212 to transmit some or all of the personal data 214 to the mobile device 202. The personal server 212 may receive a request from the mobile device 202 to transmit some or all of the personal data 214 to the mobile device 202 (step 372). In response, the personal server 212 may transmit the requested data to the mobile device 202 (step 374). In this sense, the personal server 212 may act, for example, as a file server to the mobile device 202. Alternatively, for example, the personal server 212 may transmit some or all of the personal data 214 to the mobile device 202 when the personal server 212 detects that a low-cost connection has been established between the personal server 212 and the mobile device 202. In any case, the ability to store personal data 214 on the personal server 212 rather than the mobile device 202 advantageously leverages the increased storage capacity, processing power, and bandwidth available to the personal server 212 compared to the mobile device 202.

Figure 3N:
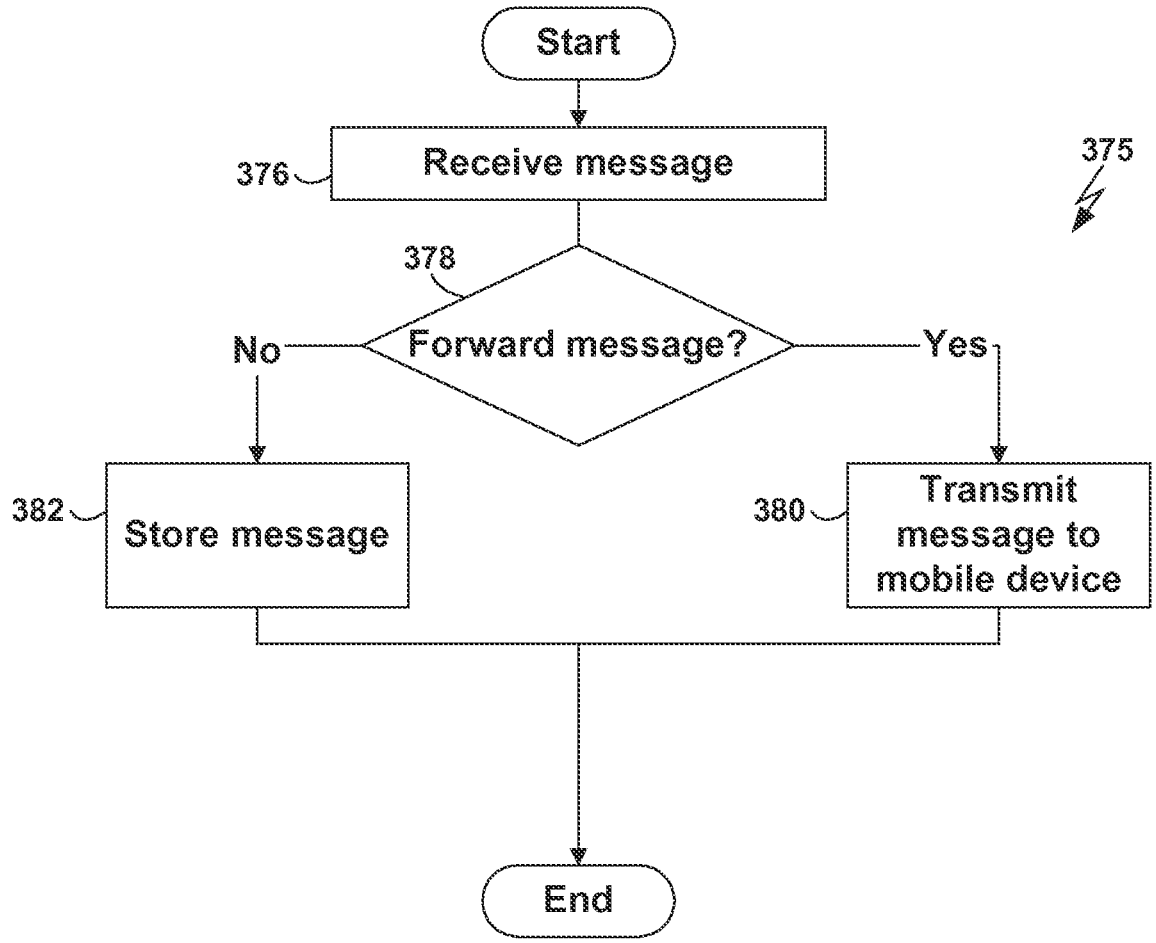
FIG. 3N is a flowchart of a method performed by a personal server to selectively store personal data on behalf of a mobile device according to one embodiment of the present invention.

The personal data 214 may be any kind of data, such as static files 214 for storage, messages transmitted by the mobile device 202, or messages having the mobile device 202 as their intended destination. For example, the configuration information 236 may be modified to configure the personal server 212 to receive messages (such as email messages, instant messages, or SMS messages) on behalf of the mobile device 202. Referring to FIG. 3N, a flowchart is shown of a method 375 that is performed by the personal server 212 according to one embodiment of the present invention to selectively receive messages on behalf of the mobile device 202. The personal server 212 receives a message having the mobile device 202 as its destination (step 376). If the personal server 212 is configured to receive messages on behalf of the mobile device 202 (step 378), the personal server 212 stores the message for the mobile device 202 (step 382). Otherwise, the personal server 212 transmits the message to the mobile device 202 (step 380). Messages stored by the personal server 212 on behalf of the mobile device 202 may be retrieved by the user 222 in any of the ways described above.

Figure 3O:
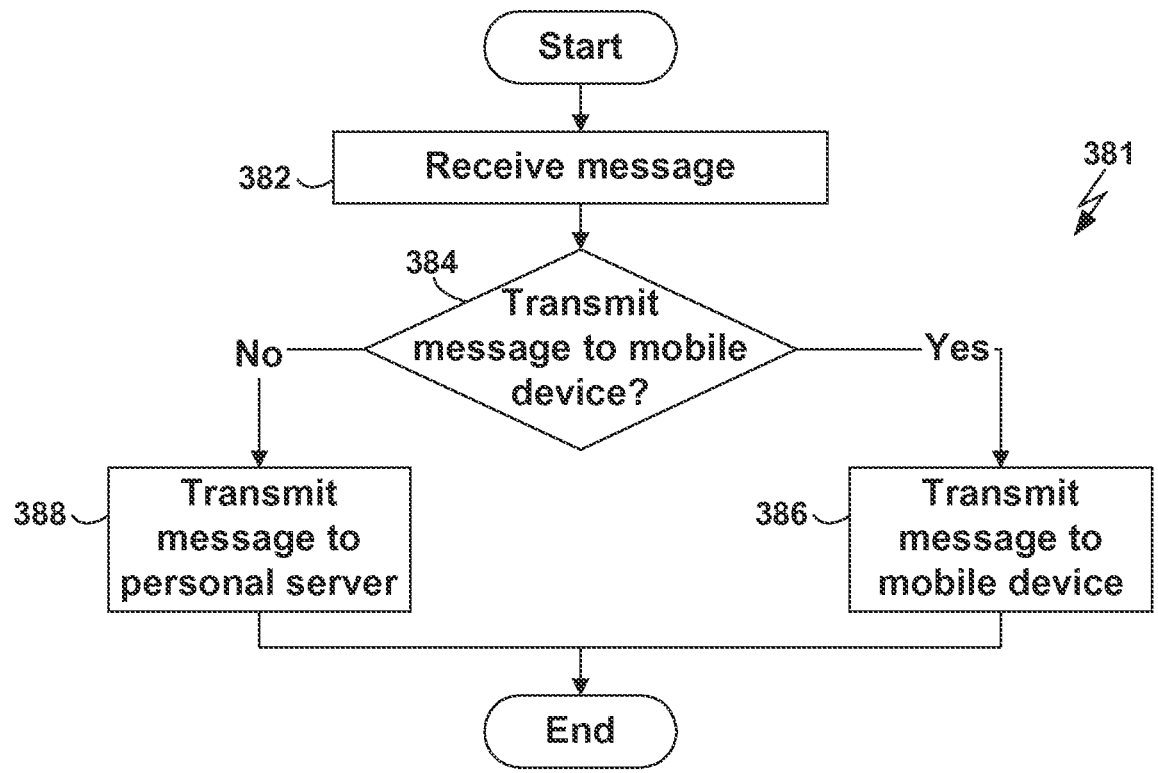
FIG. 3O is a flowchart of a method performed by a non-personal server to use a personal server to selectively store personal data on behalf of a mobile device according to one embodiment of the present invention.

Alternatively, the personal server 212 may be configured to receive messages on behalf of the mobile device 202 by modifying the account information 236a at the non-personal server 230. For example, referring to FIG. 3O, a flowchart is shown of a method 381 that is performed by the non-personal server 230 according to one embodiment of the present invention to enable the personal server 212 to selectively receive messages on behalf of the mobile device 202. The non-personal server 230 receives a message having the mobile device 202 as its destination (step 382). The non-personal server 230 determines whether it is configured to transmit messages to the mobile device 202 or to the personal server 212 (step 384). If the non-personal server 230 is configured to transmit messages to the mobile device 202, the non-personal server 230 transmits the message to the mobile device (step 386). Otherwise, the non-personal server 230 transmits the message to the personal server 212 (step 388).

The mobile device 202, rather than the non-personal server 230, may determine whether a particular message is to be transmitted to the personal server 212 rather than to the mobile device. For example, the non-personal server 230 may transmit a header of the incoming message to the mobile device 202. The mobile device 202 may determine whether the message should be transmitted to the mobile device 202 or to the personal server 212 based on information in the header (such as the size of the message). The mobile device 202 may then instruct the non-personal server 230 appropriately, in response to which the non-personal server 230 may transmit the body of the message to the mobile device 202 or to the personal server 212. Alternatively, the personal server 212 may make the determination in the manner just described for the mobile device 202. In other words, any one of the non-personal server 230, the mobile device 202, and the personal server 212 may determine whether an incoming message is to be transmitted to and stored by the personal server 212 or by the mobile device 202.

Figure 3P:
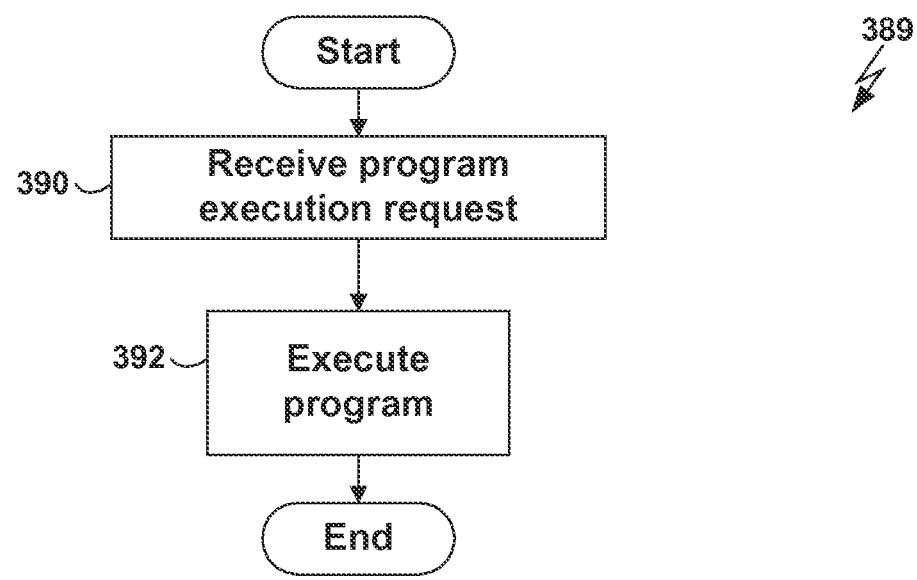
FIG. 3P is a flowchart of a method performed by a personal server to execute a program on behalf of a mobile device according to one embodiment of the present invention.

Another function that may be performed by the personal server 212 is to execute programs on behalf of the mobile device 202. For all of the reasons described above, the personal server 212 may be more suitable than the mobile device 202 for executing a variety of programs. Referring to FIG. 3P, a flowchart is shown of a method 389 that is performed by the personal server 212 in one embodiment of the present invention to execute programs on behalf of the mobile device 202. The mobile device 202 may transmit an instruction to the personal server 212 to execute a program 256 residing on (or otherwise under the control of) the personal server 212. In response to receiving such a request (step 390), the personal server 212 may execute the program 256 (step 392). For example, the program 256 may be an image processing program which may process an image stored in the personal data 214 by reducing its dimensions to a size suitable for transmission to and display by the mobile device 202. Upon executing the program 256, the personal server 212 may transmit the output of the program 256 (such as the reduced image) or any other response to the mobile device 202.

Similarly, the personal server 212 may perform processing for a game on behalf of the user 222. For example, the executable program 256 may be a game which is too expensive or resource-intensive to execute on the mobile device 202. The user 222 may therefore play the game using the mobile device 202 by executing the game on the personal server 212 and using the mobile device 202 as an interface with the personal server 212. Similarly, the executable program 256 may be a client or server program for a networked multiplayer game, thereby allowing the user 222 to play such a game even if it would be impossible or prohibitively expensive to execute the game client and/or server on the mobile device 202 itself.

The personal server 212 may become inaccessible over the WAN 220 or otherwise become unavailable for use for any of a variety of reasons. For example, the personal server 212 may crash, be turned off, or lose its connection to the WAN 220. Such inaccessibility/unavailability may last for varying periods of time. In some cases, the personal server 212 may be able make itself become available again, such as by re-establishing a connection to the WAN 220 automatically. In other cases, it may be necessary for the user 222 to make the personal server 212 available, such as by rebooting it or manually reconnecting it to the WAN 220.

As described above, the non-personal server 230 may serve as an intermediary between the personal server 212 and the shared server 204. For example, when the personal server 212 is available, the incoming message 218 transmitted by the shared server 204 to the mobile device 202 may first be received by the non-personal server 230, then transmitted by the non-personal server 230 to the personal server 212, and then transmitted by the personal server 212 to the mobile device 202. The non-personal server 230 may use the account information 236a-c to identify the personal server to which the message should be sent. If, however, the personal server 212 becomes unavailable, the non-personal server 230 will be unable to transmit messages to the personal server 212 for the duration of that unavailability.

In one embodiment of the present invention, the non-personal server 230 stores data destined for the personal server 212 as temporary personal data 234 when the personal server 212 is determined to be unavailable. Note that although only temporary personal data 234 is shown in FIG. 2B, the non-personal server 230 may store temporary personal data for use user served by the non-personal server 230. For example, the temporary personal data 234 may be stored as part of the account information 236a for the user 222, and the remaining account information 236b-c may include temporary personal data for additional users of the non-personal server 230.

Figure 3Q:
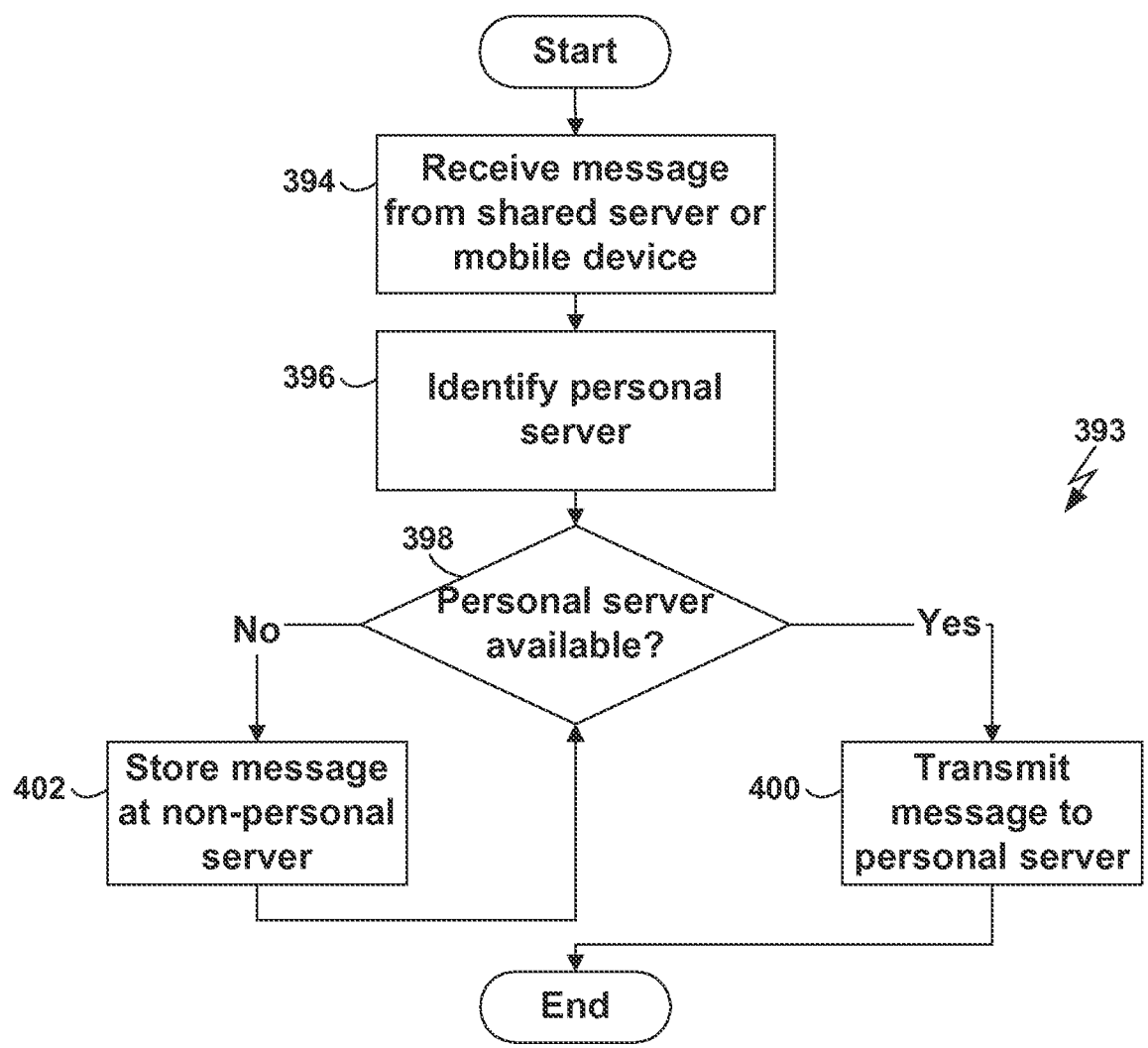
FIG. 3Q is a flowchart of a method performed by a non-personal server to temporarily store personal data on behalf of a mobile device according to one embodiment of the present invention.

Referring to FIG. 3Q, a flowchart is shown of a method 393 that is performed by the non-personal server 230 to store data destined for the personal server 212 when the personal server is unavailable. The non-personal server 230 receives a message from the shared server 204 or the mobile device (step 394). The non-personal server 212 identifies the personal server associated with the message (step 396). The non-personal server 230 determines whether the identified personal server is available over the WAN 220 (step 398). If the personal server 212 is available over the WAN 220, the non-personal server 230 transmits the message to the personal server 212 (step 400), as described above. Otherwise, the non-personal server 230 stores the incoming message 218 in the temporary personal data 234 associated with the mobile device 202 (step 402).

The non-personal server 230 may, for example, transmit a message directly to the mobile device 202 notifying it that the incoming message 218 is available for retrieval. In response, the mobile device 202 may retrieve (automatically or in response to a command from the user 222) the incoming message 218 from the temporary personal data 234 without going through the personal server 212. Alternatively, the non-personal server 230 may transmit the message 218 to the personal server 212 at a later time, when the personal server 212 again becomes available to the non-personal server 230 over the WAN 220. The non-personal server 220 may, for example, periodically attempt to establish contact with the personal server 212 and transmit the message 218 to the personal server 212 when such contact is established (steps 398, 402). Alternatively, the personal server 212 may initiate contact with the non-personal server 230 when the personal server 212 establishes a connection with the WAN 220. In response, the non-personal server 230 may transmit the message 218 to the personal server 212. In any case, once the message 218 has been transmitted to the personal server 212, it may be handled by the personal server 212 in any of the ways described above.

Outgoing messages may also be stored in the temporary personal data 234. For example, when the mobile device 202 transmits the outgoing message 210, the non-personal server 230 may receive the outgoing message 210 and determine whether the personal server 212 is accessible to the non-personal server 230 over the WAN 220. If the personal server 212 is accessible, the non-personal server 230 may transmit the outgoing message 210 to the personal server 212, and the personal server 212 may handle the message in any of the ways described above. If the personal server 212 is not accessible, the non-personal server 230 may store the outgoing message 210 in the temporary personal data 234. The non-personal server 230 may transmit the outgoing message 210 from the temporary personal data 234 to the personal server 212 when the personal server 212 again becomes accessible to the non-personal server, as described above.

As may be appreciated from the description above, embodiments of the present invention have a variety of advantages. For example, various benefits may be obtained by selecting as the personal server 212 a computing device that is more powerful than the mobile device 202 and/or which has a higher-bandwidth connection than the mobile device 202, and which therefore may perform processing tasks more efficiently than the mobile device 202. For example, the personal server 212 may filter, log, store, compress, and broadcast data more efficiently than the mobile device 202. The home PC of the user 222 may be selected as the personal server 212, thereby taking advantage of computing resources which would otherwise likely remain underutilized. Another advantage of selecting the user's home PC as the personal server 212 is that the user 222 may access the personal data 214 either remotely using the mobile device 202, or directly at the personal server 212 when the user 222 returns home.

Another advantage of various embodiments of the present invention is that the personal server 212 may serve as a proxy for a system, such as a conventional instant messaging system, which is not particularly well-suited to direct use in conjunction with a mobile device such as a cellular telephone. For example, instant messaging systems, with few exceptions, use complex, vendor-specific, heavyweight protocols. These shortcomings make them difficult to use on mobile devices, which typically have little processing power, inadequate space for multiple IM clients, and extremely limited data bandwidth. By providing the personal server, which has greater processing power, storage space, and bandwidth, with the ability to communicate directly with the IM server and to transmit IM information to and from the mobile device using a protocol that is more suitable for the mobile device 202, the personal server 212 may be used to provide the mobile device 202 with the benefits of a service such as instant messaging without the typical drawbacks.

Some existing systems use shared public servers to perform certain functions described herein, such as logging and filtering instant messages for users. It is advantageous, however, to perform these and other functions using a personal server rather than a shared public server. In general, the personal server 212 may provide services to the mobile device 202 more flexibly, less expensively, more securely, and more efficiently than a shared public server. For example, one advantage of using the user's home PC, or other computer under the control of the user 222, as an IM proxy or other proxy, is that the user 222 may configure the personal server 212 as desired. For example, the user 222 may tune the personal server's performance, such as by customizing the configuration of the pseudo-client 240 or upgrading the hardware of the personal server 212, unlike in conventional systems, in which the IM server is under the control of a service provider rather than the user. Furthermore, the user 222 may establish a secure communications channel between the mobile device 202 and the personal server 212, even when such a secure channel would not be available for use with a shared public server. In addition, service providers typically charge an additional fee for using shared public servers to performs functions such as logging and filtering. The user 222 may avoid such costs by using the personal server 212 to perform such functions.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. In particular, techniques described herein may be combined with each other in various ways that will be apparent to those having ordinary skill in the art based on the description herein.

The mobile device 202 may be any kind of mobile device 202 capable of performing the functions described herein. For example, the mobile device 202 may be a cellular telephone, personal digital assistant (PDA), laptop, or a combination thereof. The personal server 212 may be any kind of computing device, such as a workstation or desktop or laptop PC.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions stored on at least one non-transitory computer-readable medium, the method comprising:
    (A) creating first personal data on a cellular telephone, the first personal data comprising at least one of audio, video, and image data;
    (B) storing the first personal data in a first file in persistent storage on the cellular telephone;
    (C) transmitting, at backup software executing on the cellular telephone, via a first wide area network connection over a network, the network including a cellular telephone network, the first personal data from the cellular telephone to a server;
    (D) at the server, receiving the first personal data from the cellular telephone over the cellular telephone network;
    (E) at the server, determining whether the first personal data satisfy predetermined criteria; and
    (F) at the server, if the first personal data are determined to satisfy the predetermined criteria, then storing the first personal data.

2. The method of claim 1, wherein the network comprises the Internet, and wherein transmitting the first personal data from the cellular telephone to the server comprises transmitting the first personal data from the cellular telephone to the server over the Internet.

3. The method of claim 1, wherein the first personal data comprises video data.

4. The method of claim 1, wherein the first personal data comprises image data.

5. The method of claim 1, wherein the first personal data comprises a word processing document.

6. The method of claim 1, wherein the first personal data comprises a message.

7. A non-transitory computer-readable medium comprising computer program instructions stored thereon, wherein the computer program instructions are executable by at least one computer processor to execute a method, the method comprising:
    (A) creating first personal data on a cellular telephone, the first personal data comprising at least one of audio, video, and image data;
    (B) storing the first personal data in a first file in persistent storage on the cellular telephone;
    (C) transmitting, at backup software executing on the cellular telephone, via a first wide area network connection over a network, the network including a cellular telephone network, the first personal data from the cellular telephone to a server;

(D) at the server, receiving the first personal data from the cellular telephone over the cellular telephone network;

(E) at the server, determining whether the first personal data satisfy predetermined criteria; and (F) at the server, if the first personal data are determined to satisfy the predetermined criteria, then storing the first personal data.

8. The non-transitory computer-readable medium of claim 7, wherein the network comprises the Internet, and wherein transmitting the first personal data from the cellular telephone to the server comprises transmitting the first personal data from the cellular telephone to the server over the Internet.

9. The non-transitory computer-readable medium of claim 7, wherein the first personal data comprises video data.

10. The non-transitory computer-readable medium of claim 7, wherein the first personal data comprises image data.

11. The non-transitory computer-readable medium of claim 7, wherein the first personal data comprises a word processing document.

12. The non-transitory computer-readable medium of claim 7, wherein the first personal data comprises a message.

* * * * *